Patented May 25, 1926.

1,586,253

UNITED STATES PATENT OFFICE.

JOHN W. LIVINGSTON, OF ST. LOUIS, MISSOURI, AND LUCAS P. KYRIDES, OF BUFFALO, NEW YORK.

MANUFACTURE OF MONONITROCHLOROBENZENE.

No Drawing. Application filed August 8, 1925. Serial No. 49,100.

This invention relates to an improved process for nitrating chlorobenzene and more particularly to the manufacture of mononitrochlorobenzene.

It is well-known that when chlorobenzene is nitrated by subjecting it to the action of nitrating agents that various mono-, di- and poly-nitro derivatives are produced depending on the character of the nitrating agents employed and on the conditions, especially time, acid concentration and temperature, under which the process of nitration is carried out.

It has been heretofore purposed to effect the nitration of chlorobenzene for the production of mononitrochlorobenzene, and particularly dinitrochlorobenzene, by slowly adding chlorobenzene to a mixture of concentrated sulfuric acid, sp. gr. 1.83–1.84, and sodium or potassium nitrate. In proceeding in this way, it is difficult to control the reaction so as to produce the desired nitration products and obtain economic yields, the tendency being either for the reaction to proceed incompletely or to proceed too energetically with formation of a mixture of products which are contaminated with other nitro bodies or with impurities such as tars, resins, etc. Moreover, at times, temperatures are reached which give rise to dangerous reactions accompanied by copious evolution of oxides of nitrogen and consequent loss of considerable quantities of nitric acid.

According to the present invention, we have discovered that the nitration of chlorobenzene may be effectively and economically carried out by subjecting it to the action of a mixture of sodium nitrate, or an equivalent nitrate, and sulfuric acid provided suitable conditions of temperature, acid concentration, proportions, agitation, etc., are maintained. We have found that by the initial use of a weaker sulfuric acid than hitherto employed, and at a higher initial temperature, the nitration of chlorobenzene takes place readily and is easily controlled. Under these conditions, the sulfuric acid readily dissolves the sodium nitrate forming sodium acid sulfate, most of which, if not all, remains in solution; while the addition of stronger sulfuric acid during the nitration preserves, within limits, the concentration of the sulfuric acid medium throughout the course of the reaction. The comparatively high temperatures used in the process greatly facilitate the speed of nitration and markedly decrease the time necessary to complete the reaction.

In carrying out the invention, sodium nitrate, sulfuric acid, and chlorobenzene are contemporaneously and gradually added to a well-stirred and thoroughly agitated sulfuric acid titrating between about 70 and 90 percent as $H_2SO_4$, heated to a temperature above 70° and at such a rate that proportionate parts, or approximately so, of each substance are added in the same period of time. The addition of the sulfuric acid and chlorobenzene may be done from calibrated tanks and the amounts added may be so regulated as to relatively correspond, or approximately so, to the amounts of sodium nitrate added. In this way, there is at no time a violent reaction, the mixture is readily emulsified, and regular and uniform nitration takes place with minimum danger of local over-action.

The following specific example for the production of mononitrochlorobenzene will further illustrate the invention, but it is understood that the invention is not limited thereto. The parts are by weight. Example: A well stirred mixture of about 1000 parts sulfuric acid of about 81% strength and 200 parts monochlorobenzene is heated to about 100° in a jacketed nitration kettle equipped with an effective agitator. To the hot, agitated and emulsified mixture, whose temperature is controlled or regulated by means of cooling or heating with water or steam in the jacket as may be required, there is gradually added about 1175 parts pulverized commercial sodium nitrate, preferably of 96 to 98 percent purity and about 1600 parts sulfuric acid of about 93 percent strength, and 1240 parts monochlorobenzene, in such a manner and at such a rate that proportional parts, or nearly so, of each substance are added in about the same period of time.

Under such conditions it is not possible for unreacted sodium nitrate to be present at any given time in more than small amounts.

The heat of nitration soon raises the temperature to above 110° C. The reaction is maintained at about 110° to 130° C. by the rate of addition of the components and by the cooling and heating means available. It usually requires about two to five hours to add the components. After all the components have been added, the reaction mixture is further maintained at a temperature of about 110° to 130° C. for about one hour, or until the nitration is complete. When the nitration is completed, the nitration product which is comprised almost wholly of the mononitrochlorobenzene, can be isolated in any suitable and well-known manner. For example, the reaction mixture may be added to water or it may be allowed to settle, the spent acid drawn off, and the nitration product washed with water or dilute caustic alkali, or both, and, if desired, subsequently distilled. Calculated on the chlorobenzene used, the yield of mononitrochlorobenzene is excellent.

In the above example, the invention may be carried out by mixing all of the chlorobenzene with the diluted sulfuric acid of about 81%, at the beginning of the operation and subsequently adding only the nitrate and the strong sulfuric acid in proportionate amounts. The reaction can also be carried out by adding some mononitrochlorobenzene into the reaction kettle before the start of the nitration in which case the reaction can be carried out at temperatures ranging up to the boiling point of mononitrochlorobenzene. It is further understood that the term "strong sulphuric acid" includes oleum.

The present invention makes it possible to nitrate chlorobenzene and obtain mononitrochlorobenzene in excellent yield and in a state of high purity, being almost entirely free from tars, resins, etc., as well as from polynitro compounds by the use of solid sodium nitrate, or other nitrates and sulfuric acid. It permits the nitration to be carried out under conditions easily controlled. The rate at which the sodium nitrate and sulphuric acid are subsequently added depends on the external cooling or heating means available, thus permitting a smooth nitration without the evolution of large quantities of oxides of nitrogen.

We claim as our invention:—

1. The process of nitrating chlorobenzene to mononitrochlorobenzene which comprises the gradual and proportional addition of chlorobenzene and sodium nitrate to sulfuric acid having a strength of between about 65–90 percent at a temperature between about 70 and 240° C.

2. The process of nitrating chlorobenzene to mononitrochlorobenzene which comprises the gradual and proportional addition of sodium nitrate, sulfuric acid stronger than 85 percent, and chlorobenzene to sulfuric acid of about 65–90 percent strength at a temperature of between about 70 and 240° C.

3. The process of nitrating chlorobenzene to mononitrochlorobenzene which comprises the gradual and proportionate addition of chlorobenzene and sodium nitrate to a well agitated sulfuric acid of between about 65 and 90 percent strength and chlorobenzene heated to a temperature of between about 70° C and the boiling point of chlorobenzene.

4. The process of nitrating chlorobenzene to mononitrochlorobenzene which comprises the gradual and proportionate addition of chlorobenzene and sodium nitrate to a well agitated mixture of sulfuric acid of between about 65 and 90 percent strength and mononitrochlorobenzene maintained at a temperature between about 70° C. and the boiling point of mononitrochlorobenzene.

5. The process of nitrating chlorobenzene to mononitrochlorobenzene which comprises the gradual and proportionate addition of chlorobenzene and sodium nitrate to a well agitated mixture of about 65–90 percent sulfuric acid, chlorobenzene and mononitrochlorobenzene maintained between about 70° C. and the boiling point of mononitrochlorobenzene.

6. The process of nitrating chlorobenzene to mononitrochlorobenzene which comprises the gradual and proportionate addition of chlorobenzene and sodium nitrate to well agitated sulfuric acid of between about 65 and 90 percent strength at a temperature between about 70 and 130° C.

7. The process of nitrating chlorobenzene to mononitrochlorobenzene which comprises the gradual and proportionate addition of chlorobenzene, sulfuric acid stronger than 85 percent and sodium nitrate to well agitated sulfuric acid having a strength of between about 65 and 90 percent at a temperature between about 70 and 130° C.

8. The process of nitrating chlorobenzene to mononitrochlorobenzene which comprises the gradual and proportionate addition of sulfuric acid stronger than 85 percent and sodium nitrate to a well agitated mixture of chlorobenzene and sulfuric acid of about 65–90 percent at a temperature between about 70 and 130° C.

9. In a process of manufacturing mononitrochlorobenzene, the step which comprises the gradual and proportionate addition of sulfuric acid stronger than 85 percent, sodium nitrate and chlorobenzene to a well agitated mixture of sodium nitrate and sulfuric acid having a strength of 65 to 90 percent and maintained at a temperature between about 70 and 130° C.

10. In the process of manufacturing mononitrochlorobenzene, the steps which comprises adding the components, chlorobenzene, strong sulfuric acid and sodium nitrate to diluted sulphuric acid at such a rate that the acidity of the sulphuric acid in the nitration in time is maintained at between about 70 and 90 percent strength.

11. The process of manufacturing mononitrochlorobenzene which comprises the gradual and proportionate addition of about 1175 parts commercial pulverized sodium nitrate, about 1240 parts monochlorobenzene, and about 1600 parts sulfuric acid of about 93 percent strength to a well agitated mixture of about 200 parts monochlorobenzene and about 1000 parts of sulfuric acid of about 81 percent strength at a temperature of between about 100 and 130° C.

12. The process of manufacturing mononitrochlorobenzene which comprises the gradual and proportionate addition of about 1175 parts commercial pulverized sodium nitrate, about 1440 parts chlorobenzene and about 1600 parts sulfuric acid of about 93 percent strength to about 1000 parts sulfuric acid of about 81 percent strength which is well agitated and maintained at a temperature between about 100 and 130° C.

13. The process of manufacturing mononitrochlorobenzene which comprises the gradual and proportionate addition of about 1125 parts commercial pulverized sodium nitrate, about 1440 parts chlorobenzene and about 1600 parts 93 percent sulfuric acid to a well agitated mixture of about 1000 parts 81 per cent sulfuric acid and 50 parts sodium nitrate at a temperature which is maintained at between about 100 and 130° C.

JOHN W. LIVINGSTON.
LUCAS P. KYRIDES.